(12) United States Patent
Shi

(10) Patent No.: US 12,685,955 B2
(45) Date of Patent: Jul. 21, 2026

(54) FILTER DEVICE FOR COMPRESSED AIR

(71) Applicant: Yinqiao Shi, Yueqing (CN)

(72) Inventor: Yinqiao Shi, Yueqing (CN)

( * ) Notice: Subject to any disclaimer, the term of this patent is extended or adjusted under 35 U.S.C. 154(b) by 0 days.

(21) Appl. No.: 19/534,956

(22) Filed: Feb. 10, 2026

(65) Prior Publication Data

US 2026/0183692 A1 Jul. 2, 2026

(51) Int. Cl.
| | |
|---|---|
| *B01D 46/62* | (2022.01) |
| *B01D 39/20* | (2006.01) |
| *B01D 46/00* | (2022.01) |
| *B01D 46/42* | (2006.01) |
| *B01D 46/46* | (2006.01) |
| *B01D 53/04* | (2006.01) |

(52) U.S. Cl.
CPC ......... B01D 46/62 (2022.01); B01D 39/2027 (2013.01); B01D 46/0005 (2013.01); B01D 46/0031 (2013.01); B01D 46/0036 (2013.01); B01D 46/4272 (2013.01); B01D 46/46 (2013.01); B01D 53/0415 (2013.01); *B01D 2253/102* (2013.01); *B01D 2257/702* (2013.01); *B01D 2257/90* (2013.01); *B01D 2265/029* (2013.01); *B01D 2271/027* (2013.01); *B01D 2275/105* (2013.01); *B01D 2275/201* (2013.01)

(58) Field of Classification Search
CPC . B01D 46/62; B01D 46/0005; B01D 46/0031
See application file for complete search history.

(56) References Cited

U.S. PATENT DOCUMENTS

| | | | | |
|---|---|---|---|---|
| 3,555,787 | A | * | 1/1971 | Lustig ...................... F24F 3/12 |
| | | | | 96/372 |
| 2024/0367074 | A1 | | 11/2024 | Okamoto et al. |
| 2025/0293657 | A1 | | 9/2025 | Ashida et al. |
| 2025/0330137 | A1 | | 10/2025 | Ogawa |

FOREIGN PATENT DOCUMENTS

| | | | | |
|---|---|---|---|---|
| CN | 111773829 | A | * 10/2020 | ............. B01D 46/62 |

* cited by examiner

*Primary Examiner* — Robert A Hopkins
(74) *Attorney, Agent, or Firm* — Hemisphere Law, PLLC

(57) ABSTRACT

A filter device for compressed air, including: a first filter assembly having a first air inlet and a first air outlet. A second filter assembly having a second air inlet and a second air outlet, the second air inlet is in fluid communication with the first air outlet. A third filter assembly having a third air inlet and a third air outlet, the third air inlet is in fluid communication with the second air outlet, and the third air outlet is configured to discharge filtered compressed air for use. An air pressure regulating assembly connected to an upper end of the second filter assembly, the air pressure regulating assembly having an air inlet passage in fluid communication with the second air inlet, the air pressure regulating assembly is configured to regulate pressure of air entering the second filter assembly.

20 Claims, 16 Drawing Sheets

FILTER DEVICE FOR COMPRESSED AIR

TECHNICAL FIELD

The present disclosure relates to the technical field of filtration devices, in particular to a filter device for compressed air.

BACKGROUND

Compressed air is widely used in the industrial field, including but not limited to semiconductor manufacturing, electronics, machinery, chemical engineering, automotive, metallurgy, furniture manufacturing, and the like. In most cases, such compressed air is produced by compressing ambient atmospheric air using a compressor. The resulting compressed air inevitably contains impurities such as water, oil, and dust/particulate matter. These impurities can significantly adversely affect filter device quality in various industries. In precision industries that require a clean environment, untreated compressed air generally fails to satisfy the stringent usage requirements. Consequently, compressed air filters are extensively employed to filter and remove such impurities from the compressed air.

Conventional compressed air filters typically adopt a multi-stage filtration architecture to eliminate moisture, oil mist, particulate contaminants, harmful gases, and other impurities present in the compressed air. Among these, coalescing filters and similar filter media are widely applied. However, coalescing filtering components and analogous filter media impose specific requirements on the inlet air pressure of the air stream flowing therethrough. When the pressure of the incoming air stream exceeds the rated value, the flow velocity of the air passing through the coalescing filter media becomes excessively high. As a result, fine liquid droplets do not have sufficient residence time to be adsorbed onto and coalesce on the surface of the coalescing filtering component to form larger droplets; instead, they are directly entrained and carried away by the high-velocity air stream. This leads to incomplete air-liquid separation. Furthermore, excessively high inlet pressure can cause mechanical damage to the coalescing filtering component itself, thereby substantially reducing the service life of the filter device.

SUMMARY

The present application provides a filter device for compressed air capable of effectively addressing the above-mentioned problems. The filter device for the compressed air features a simple structure and excellent sealing performance, and enables effective regulation of the air pressure of the airflow entering the filtration stage, thereby ensuring stable and reliable filtration performance while significantly extending the service life of the filter assembly.

The present disclosure provides a filter device for compressed air, including: a first filter assembly having a first air inlet and a first air outlet, the first air inlet is configured to receive compressed air to be filtered; a second filter assembly having a second air inlet and a second air outlet, the second air inlet is in fluid communication with the first air outlet; a third filter assembly having a third air inlet and a third air outlet, the third air inlet is in fluid communication with the second air outlet, and the third air outlet is configured to discharge filtered compressed air for use; an air pressure regulating assembly connected to an upper end of the second filter assembly, the air pressure regulating assembly having an air inlet passage in fluid communication with the second air inlet, the air pressure regulating assembly is configured to regulate pressure of air entering the second filter assembly.

The advantageous effects of the present application are as follows. By virtue of the structural configuration described above, the first filter assembly, the second filter assembly, and the third filter assembly are sequentially connected in series, such that the air stream flows in the following ordered path: first air inlet→first filter assembly→first air outlet-→second air inlet→second filter assembly→second air out-let→third air inlet→third filter assembly→third air outlet. Through this progressive, multi-stage filtration, water, oil, dust, and other impurities contained in the compressed air can be effectively removed, thereby reliably guaranteeing the overall filtration performance of the filter device for the compressed air with respect to product requirements.

Furthermore, the air inlet passage is in fluid communication with the second air inlet, such that the air pressure at the second air inlet is maintained substantially equal to the regulated pressure value established by the air pressure regulating assembly. Consequently, the air pressure of the airflow entering the second filter assembly is maintained within the predetermined normal working pressure range. This arrangement not only ensures the overall filtration effectiveness of the entire filter device, but also effectively prevents damage to filter media and similar elements caused by excessive pressure, thereby markedly prolonging the service life of the filter device.

BRIEF DESCRIPTION OF DRAWINGS

In order to more clearly illustrate the technical solutions of the embodiments of the present application, a brief description of the drawings required for use in the description of the embodiments is provided below. The drawings described below are merely exemplary embodiments of the present application. For those of ordinary skill in the art, other drawings may be obtained from these drawings without the exercise of inventive effort.

The present application will be further described below with reference to the accompanying drawings and specific embodiments.

DETAILED DESCRIPTION OF THE EMBODIMENTS

Figure 1:
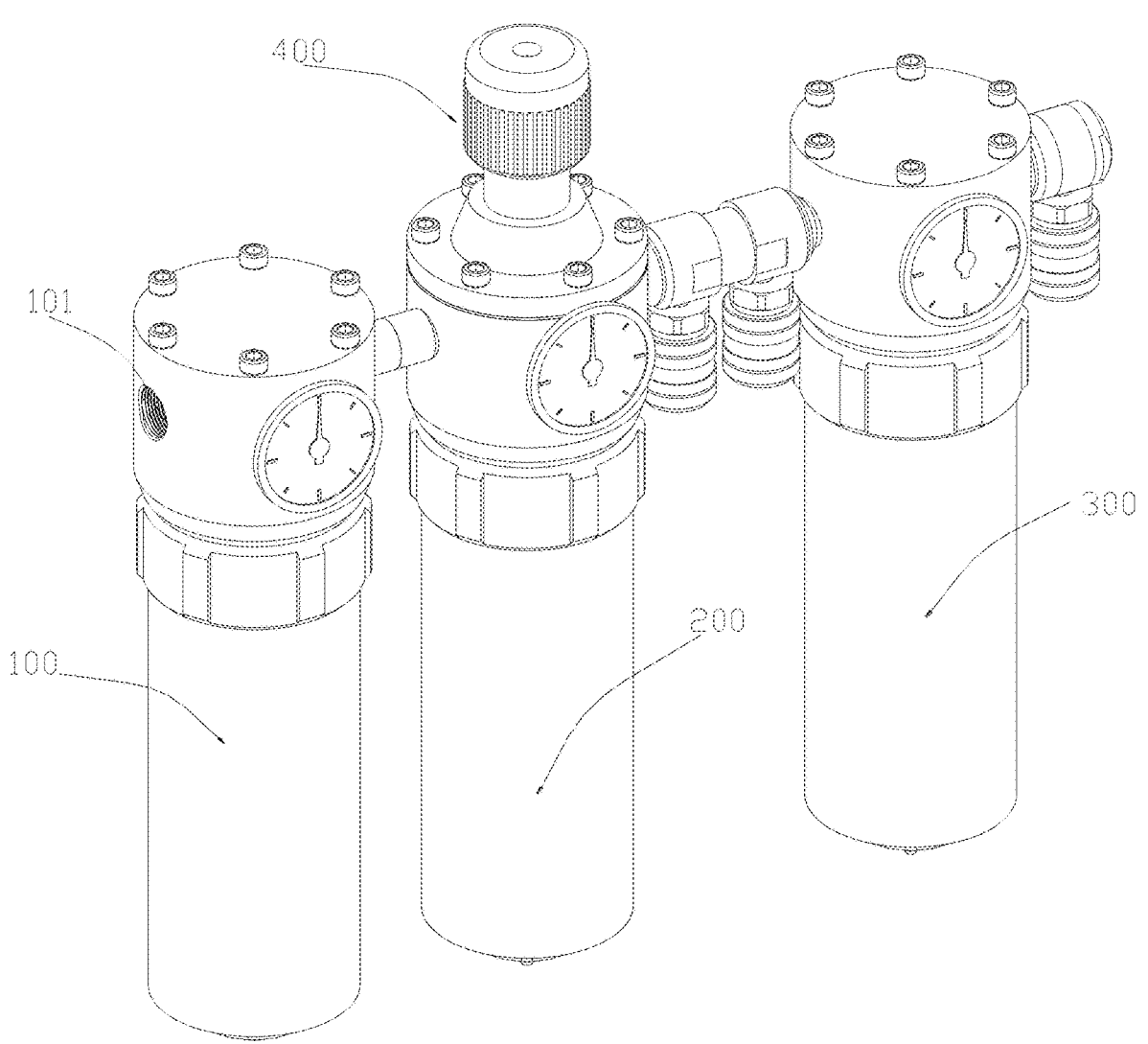
FIG. 1 is a schematic perspective view of the overall structure of a filter device for compressed air according to an embodiment of the present application from one viewing angle.

To make the above-mentioned objects, features, and advantages of the present application more apparent and readily understandable, specific embodiments of the present application are described in detail below with reference to the accompanying drawings.

In the following description, numerous specific details are set forth in order to provide a thorough understanding of the present application. However, the present application may be embodied in many other ways different from those described herein, and persons skilled in the art may make similar modifications without departing from the spirit and scope of the present application. Therefore, the present application is not limited to the specific embodiments disclosed below.

In the description of the present application, it is to be understood that, where terms such as "center," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," "circumferential," and the like appear, these terms indicate orientations or positional relationships based on the orientations or positional relationships shown in the accompanying drawings, merely for the convenience of describing the present application and simplifying the description, and do not indicate or imply that the referred device or element must have a specific orientation, be constructed and operated in a specific orientation, and therefore should not be construed as limiting the present application.

Furthermore, where terms such as "first" and "second" appear, these terms are used merely for descriptive purposes and are not to be construed as indicating or implying relative importance or implicitly specifying the number of the indicated technical features. Thus, a feature defined as "first" or "second" may explicitly or implicitly include at least one such feature. In the description of the present application, unless otherwise expressly and specifically limited, the term "plurality" or "a plurality of" means at least two (for example, two, three, etc.).

In the present application, unless otherwise expressly provided and defined, terms such as "mounted," "connected," "coupled," "fixed," and the like shall be understood in a broad sense. For example, they may refer to a fixed connection, a detachable connection, or an integral connection; may refer to a mechanical connection or an electrical connection; may refer to a direct connection or an indirect connection through an intermediate medium; may refer to internal communication between two elements or an interaction relationship between two elements, unless otherwise expressly defined. For those of ordinary skill in the art, the specific meanings of the above terms in the present application can be understood according to specific circumstances.

In the present application, unless otherwise expressly provided and defined, when a description such as a first feature being "on" or "under" a second feature appears, it may mean that the first and second features are in direct contact, or that the first and second features are in indirect contact through an intermediate medium. Moreover, the first feature being "above," "over," or "on top of" the second feature may mean that the first feature is directly above or obliquely above the second feature, or merely that the horizontal height of the first feature is greater than that of the second feature. The first feature being "below," "under," or "beneath" the second feature may mean that the first feature is directly below or obliquely below the second feature, or merely that the horizontal height of the first feature is less than that of the second feature.

It should be noted that, when an element is referred to as being "fixed to" or "disposed on" another element, it may be directly on the other element or an intervening element may also be present. When an element is referred to as being "connected to" another element, it may be directly connected to the other element or an intervening element may also be present. Where applicable, the terms "vertical," "horizontal," "upper," "lower," "left," "right," and similar expressions used in the present application are for illustrative purposes only and are not intended to indicate that they represent the only possible embodiments.

Figure 2:
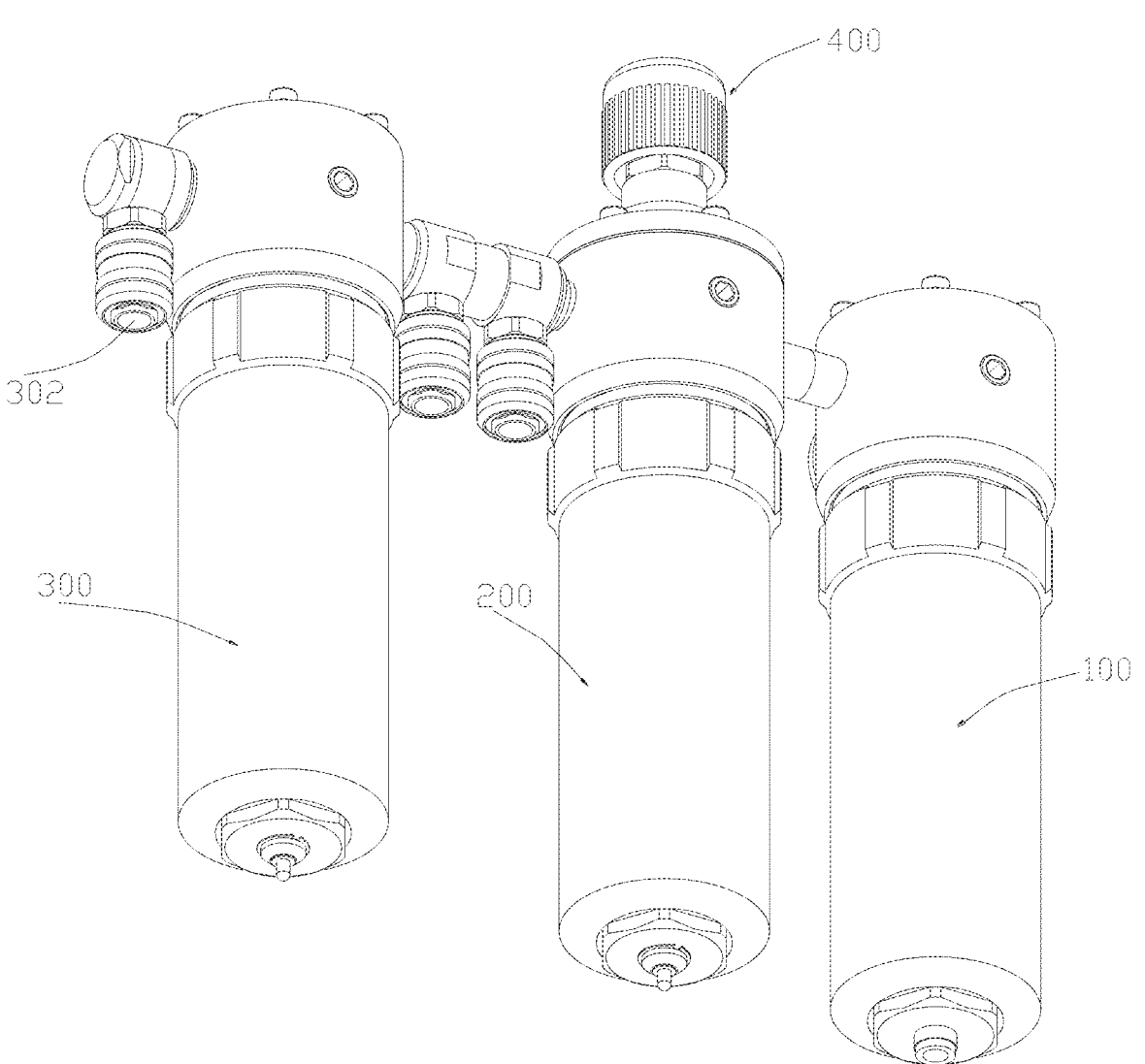
FIG. 2 is a schematic perspective view of the overall structure of the filter device according to an embodiment of the present application from another viewing angle.
Figure 3:
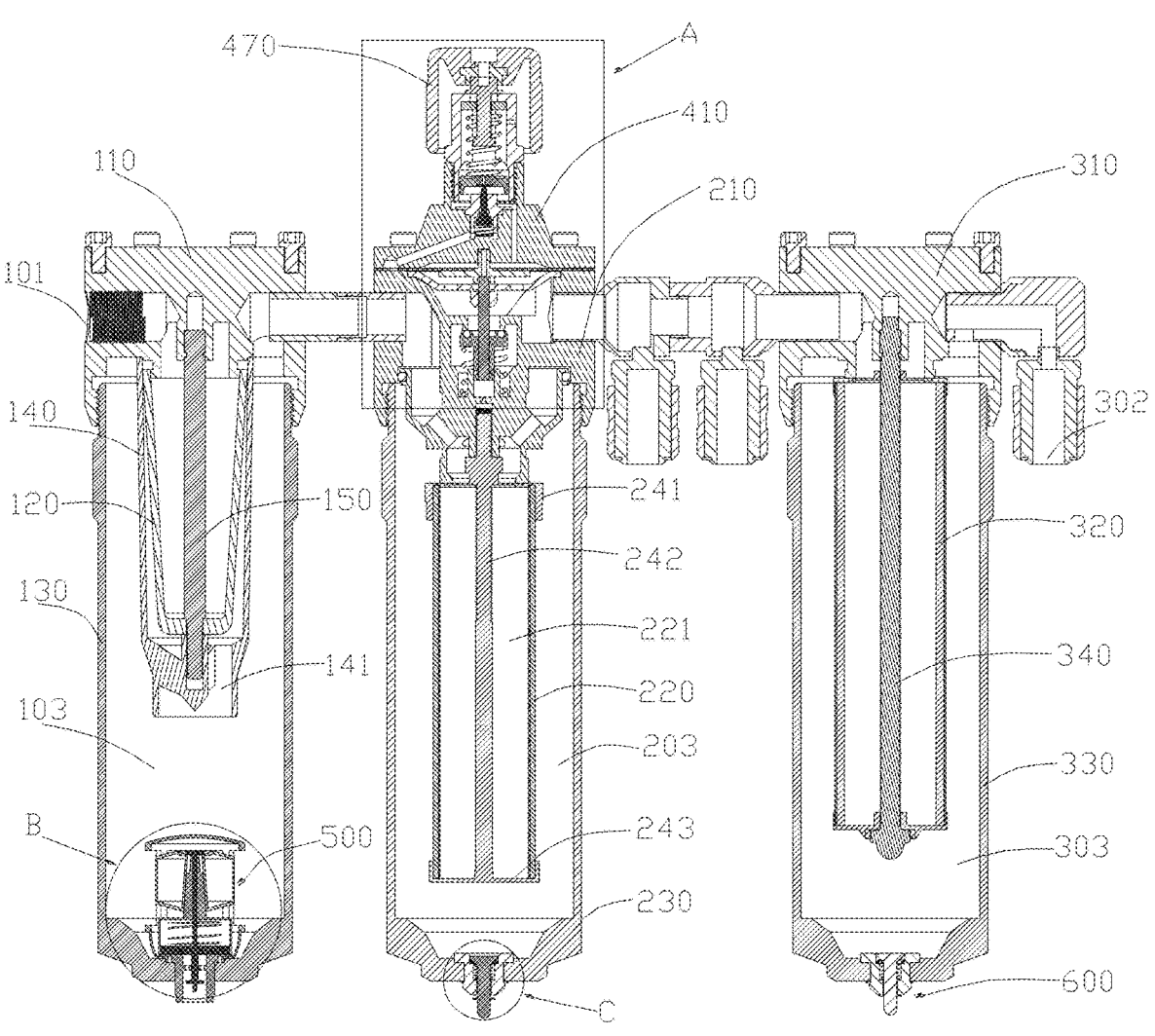
FIG. 3 is a first cross-sectional structural diagram of the filter device according to an embodiment of the present application.
Figure 4:
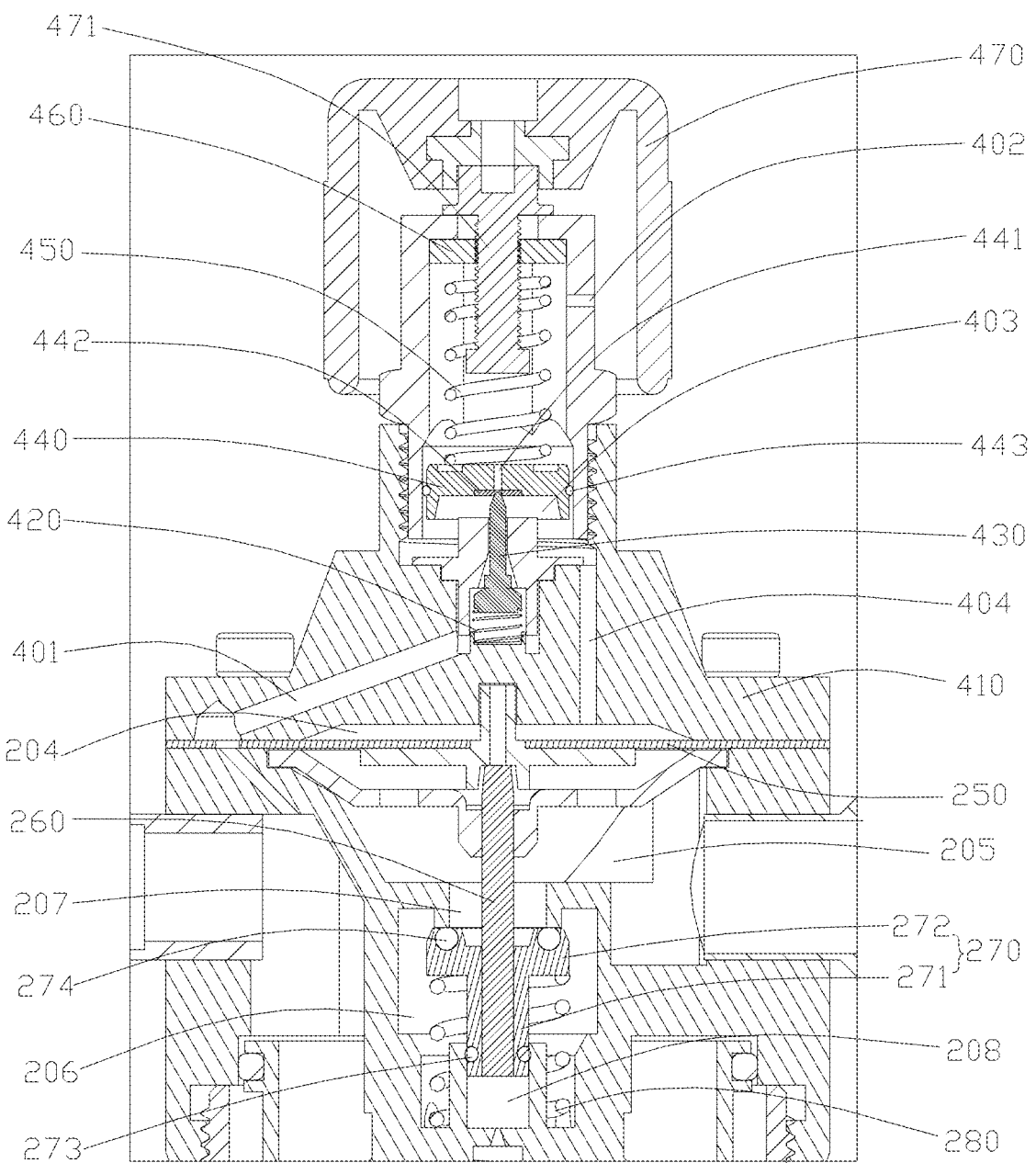
FIG. 4 is an enlarged view of a region indicated by a box A in FIG. 3.
Figure 5:
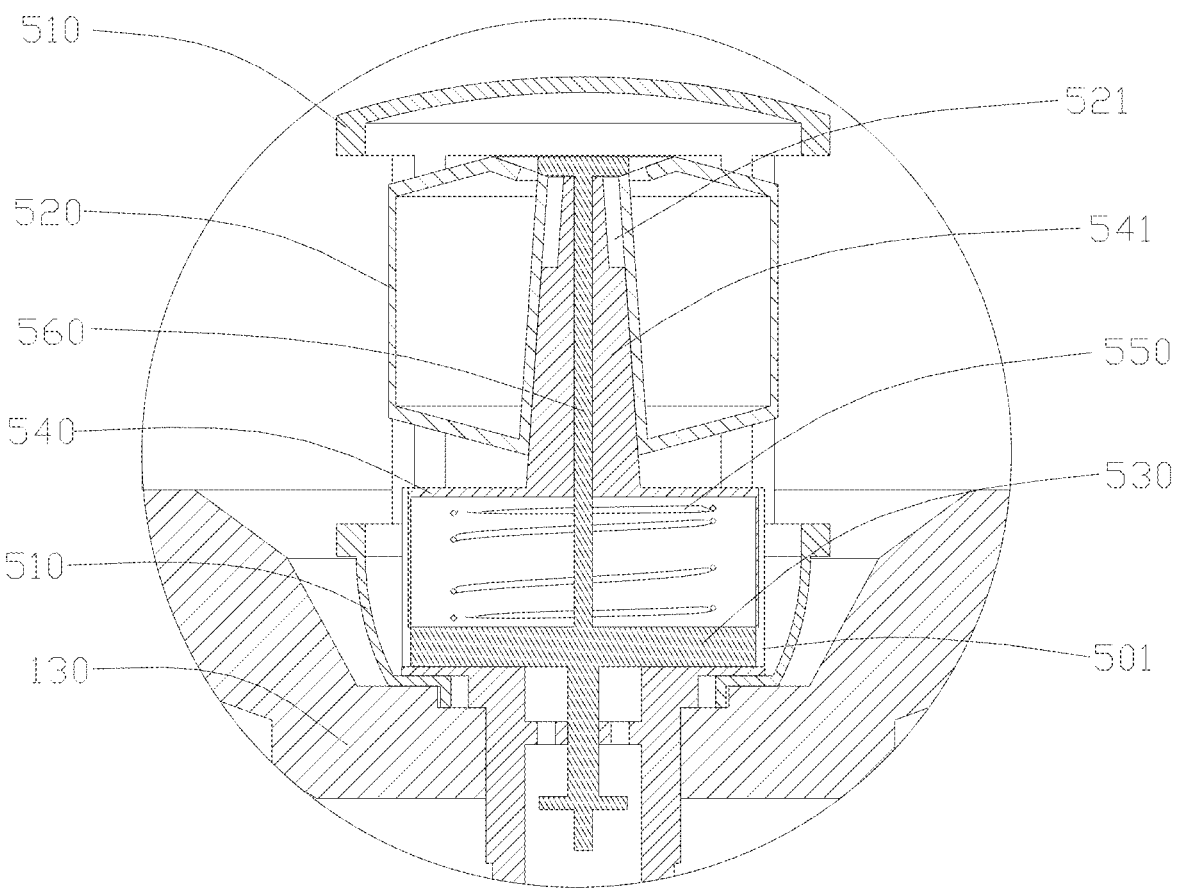
FIG. 5 is an enlarged view of a region indicated by a circle B in FIG. 3.
Figure 6:
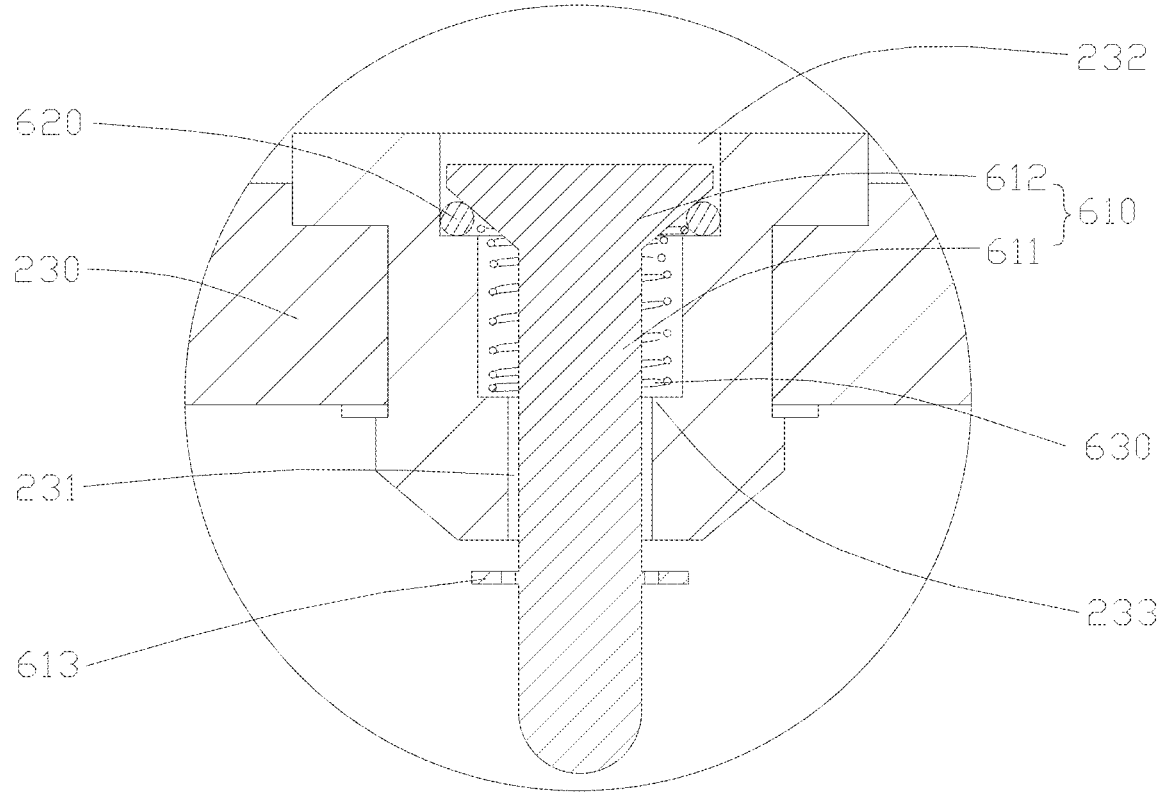
FIG. 6 is an enlarged view of a region indicated by a circle C in FIG. 3.
Figure 7:
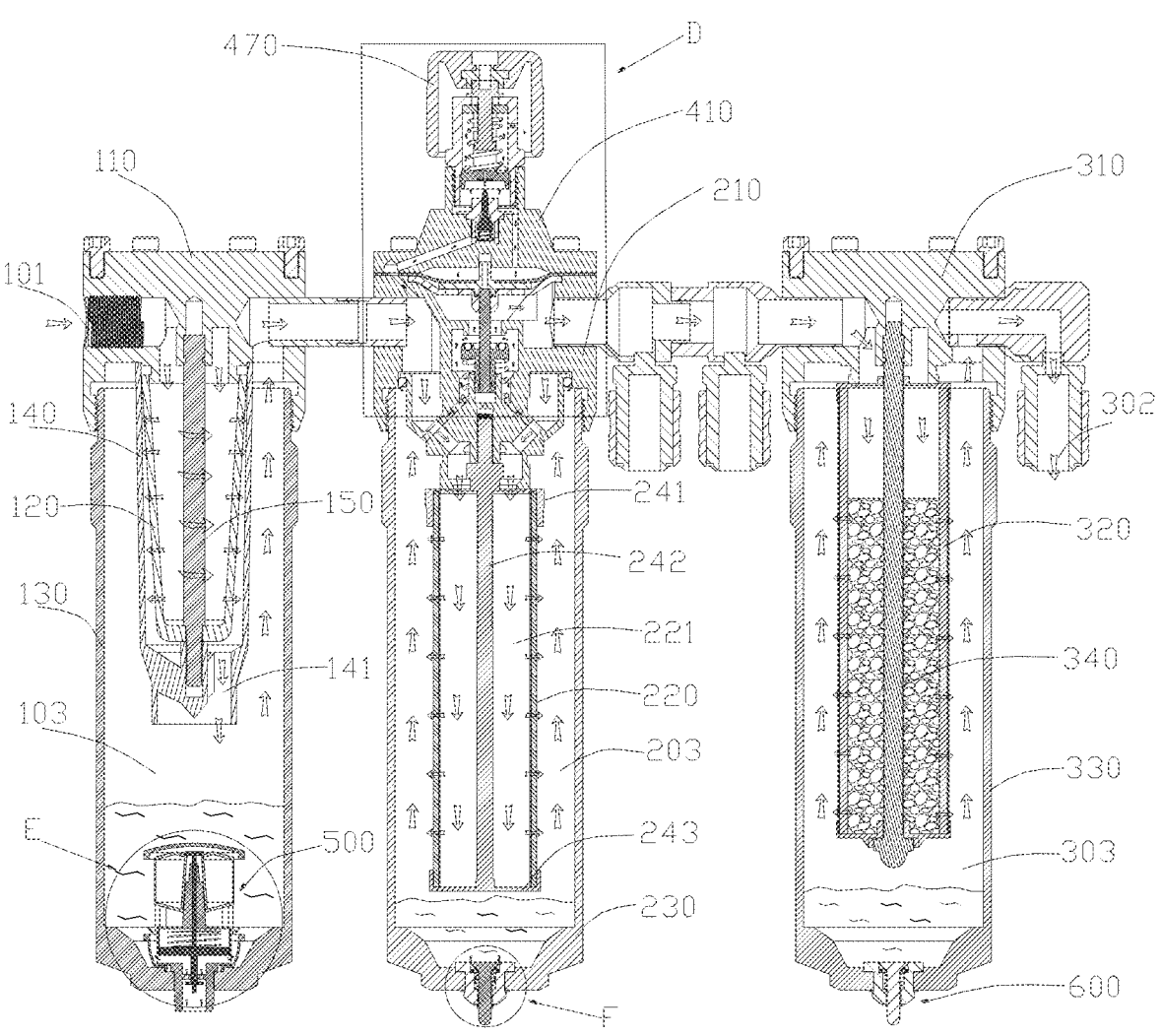
FIG. 7 is a schematic diagram illustrating air-liquid flow of the filter device according to an embodiment of the present application.
Figure 8:
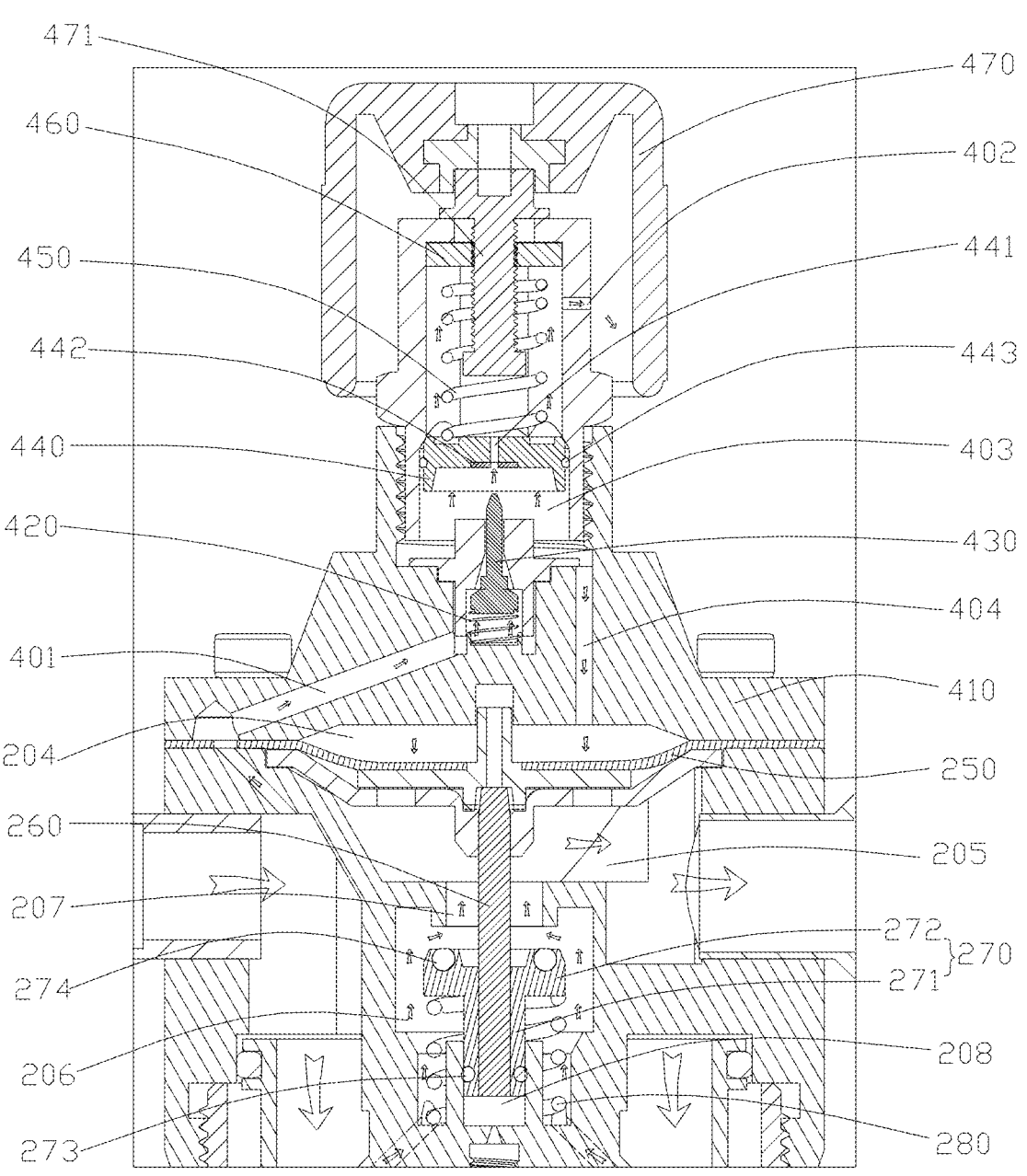
FIG. 8 is an enlarged view of a region indicated by a box D in FIG. 7.
Figure 9:
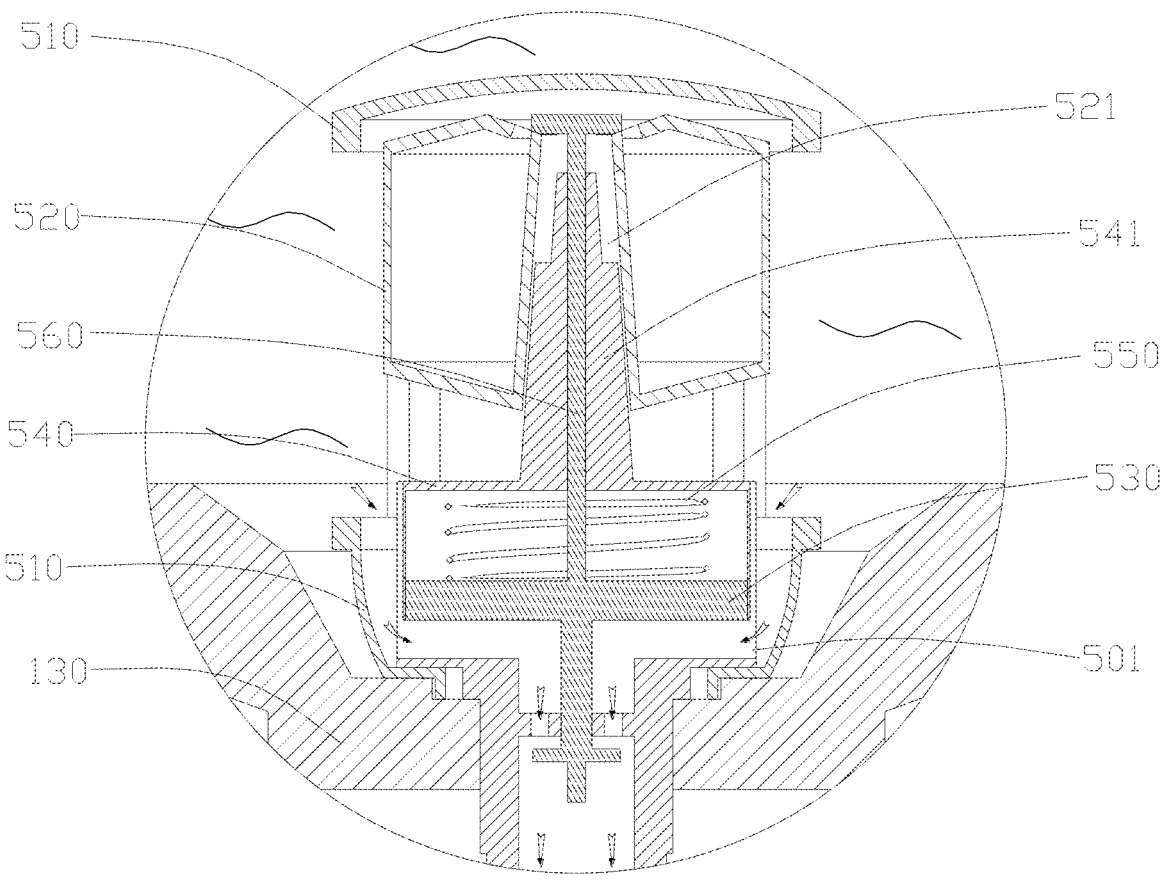
FIG. 9 is an enlarged view of a region indicated by a circle E in FIG. 7.
Figure 10:
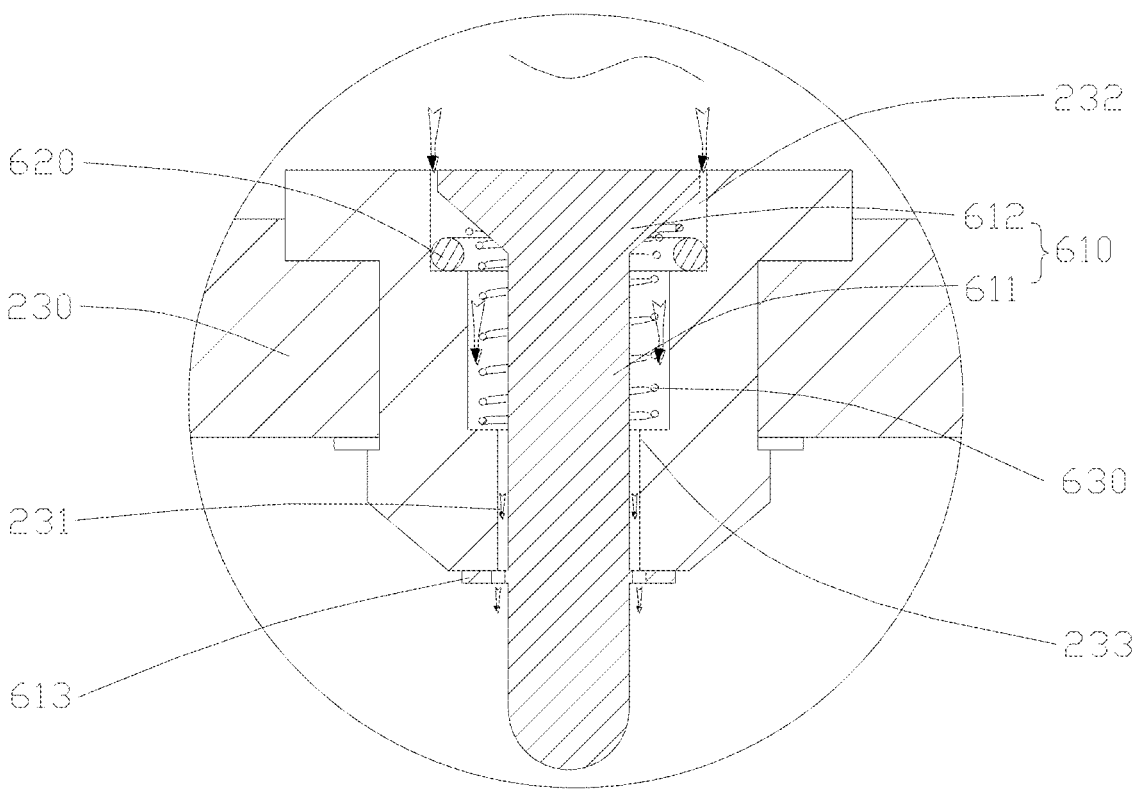
FIG. 10 is an enlarged view of a region indicated by a circle F in FIG. 7.
Figure 11:
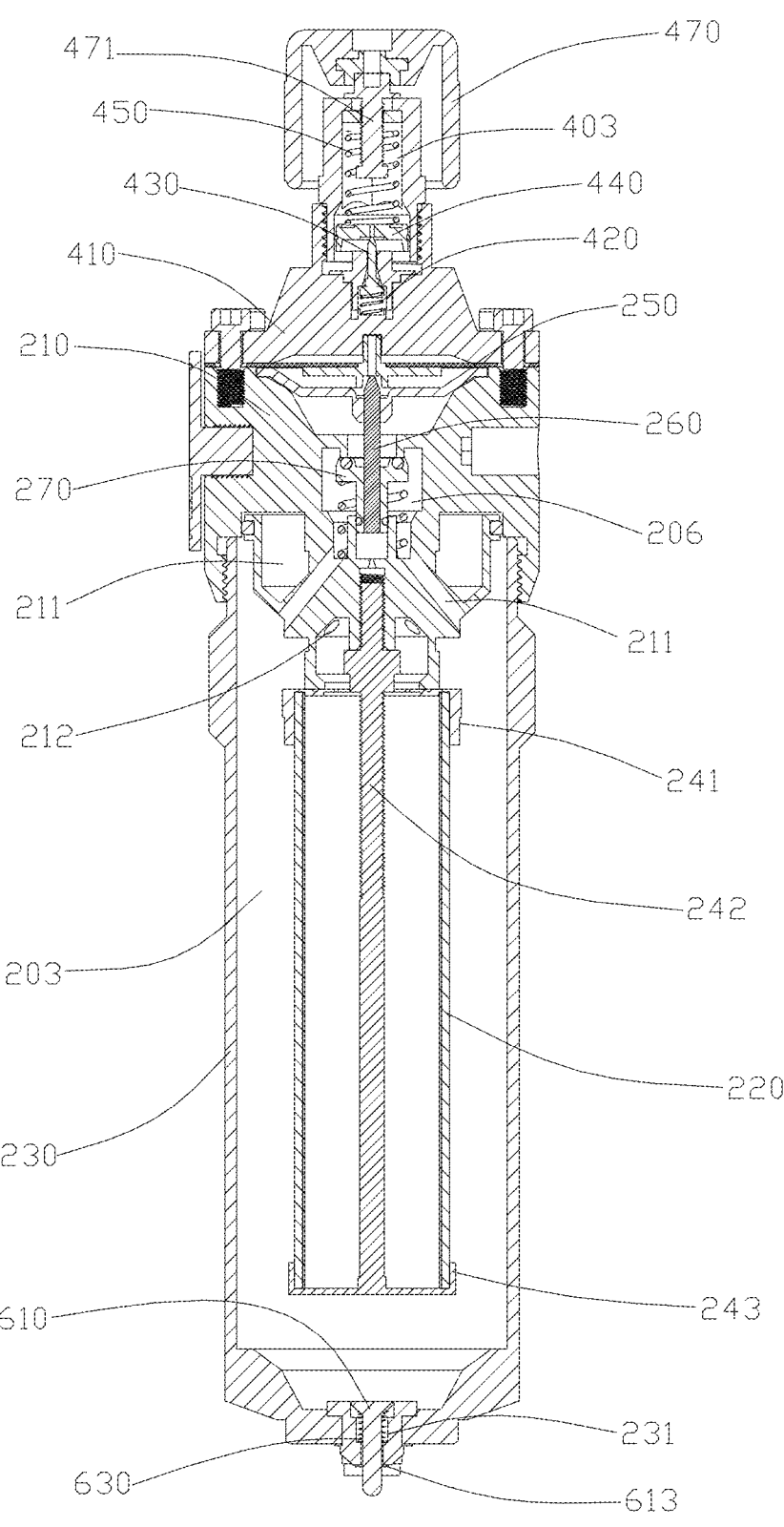
FIG. 11 is a second schematic cross-sectional structural diagram of the present application.
Figure 12:
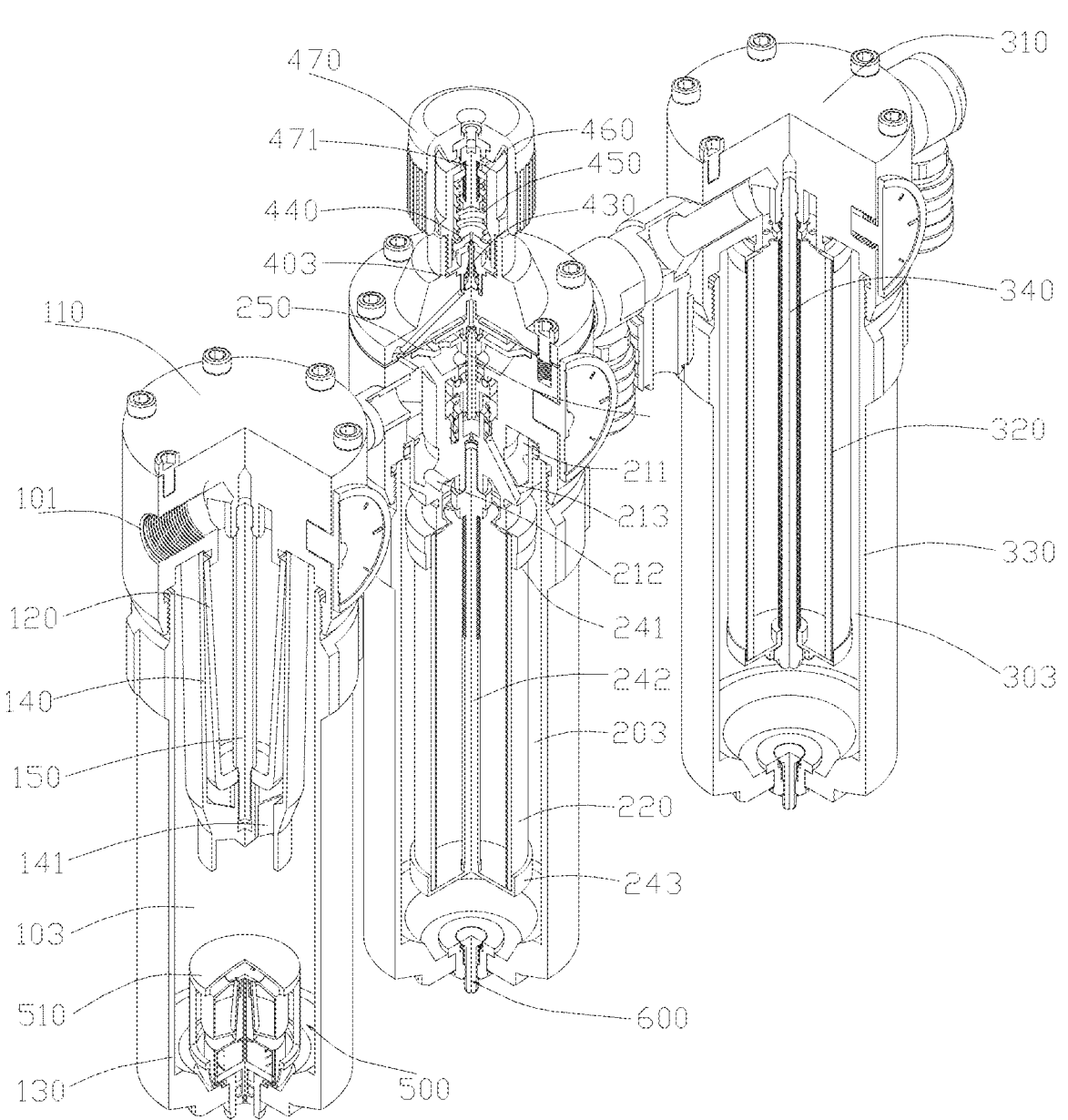
FIG. 12 is a partial cross-sectional structural diagram of the filter device according to an embodiment of the present application.
Figure 13:
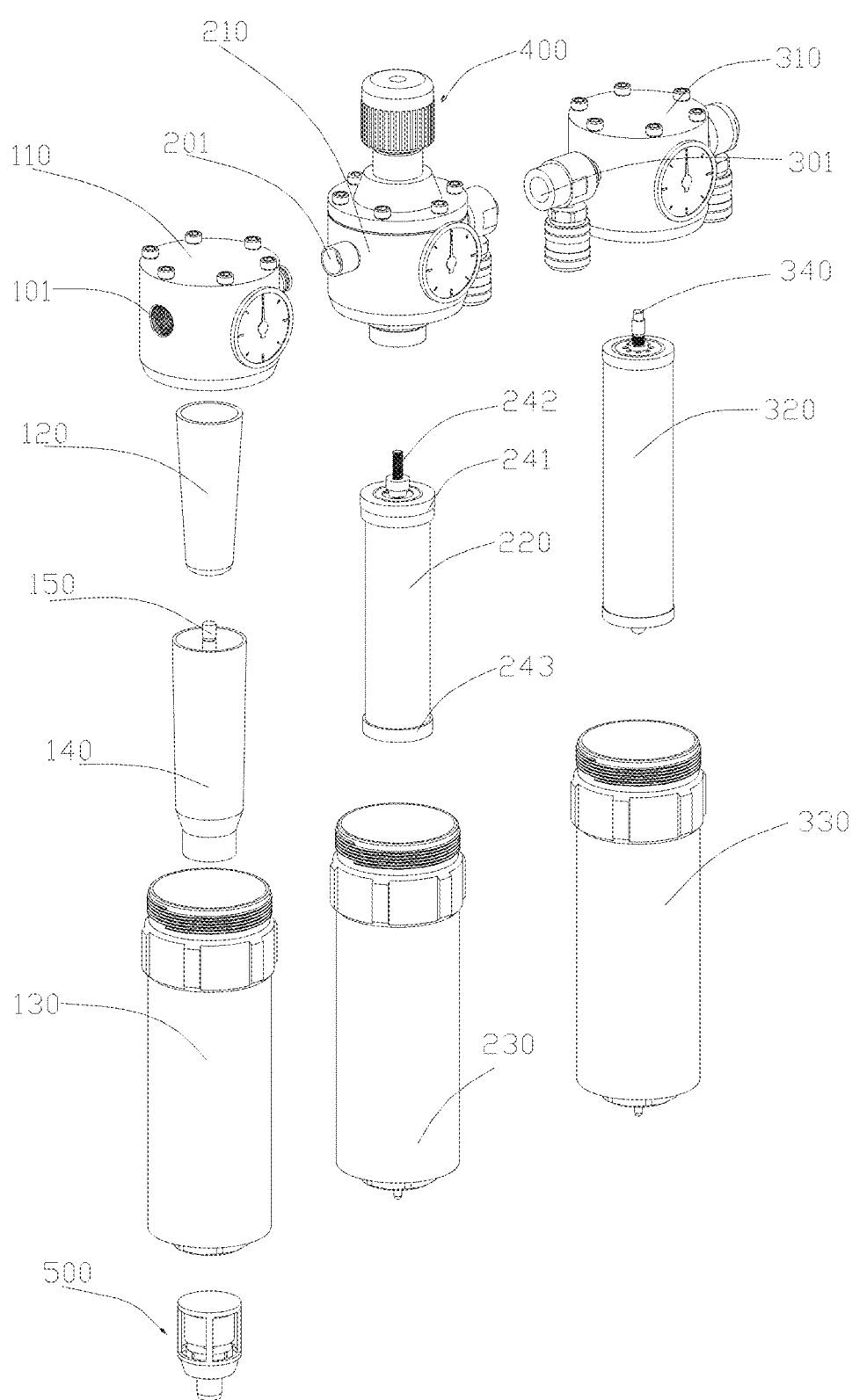
FIG. 13 is a first exploded structural diagram of the filter device according to an embodiment of the present application.
Figure 14:
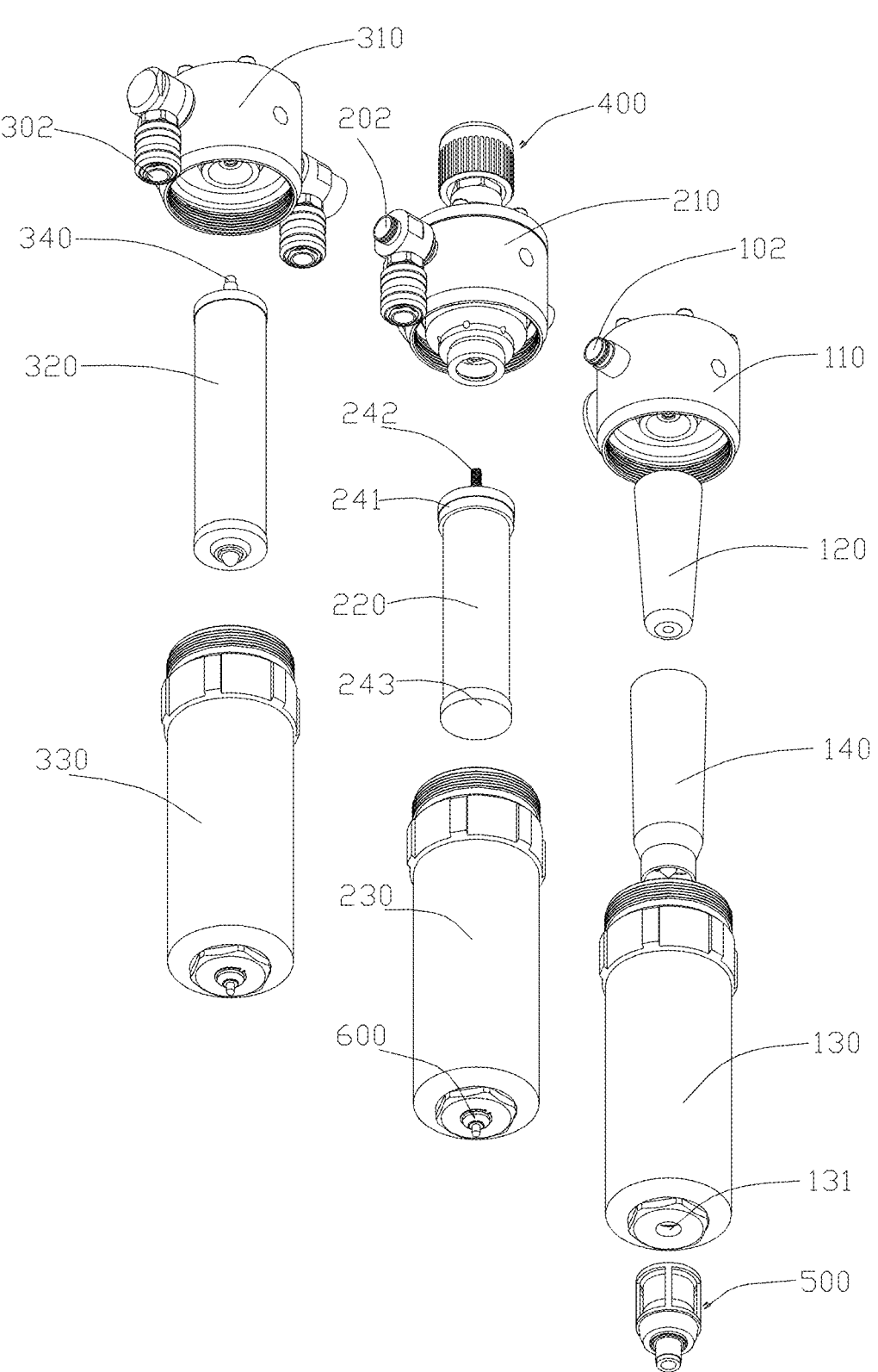
FIG. 14 is a second schematic exploded structural diagram of the filter device according to an embodiment of the present application.
Figure 15:
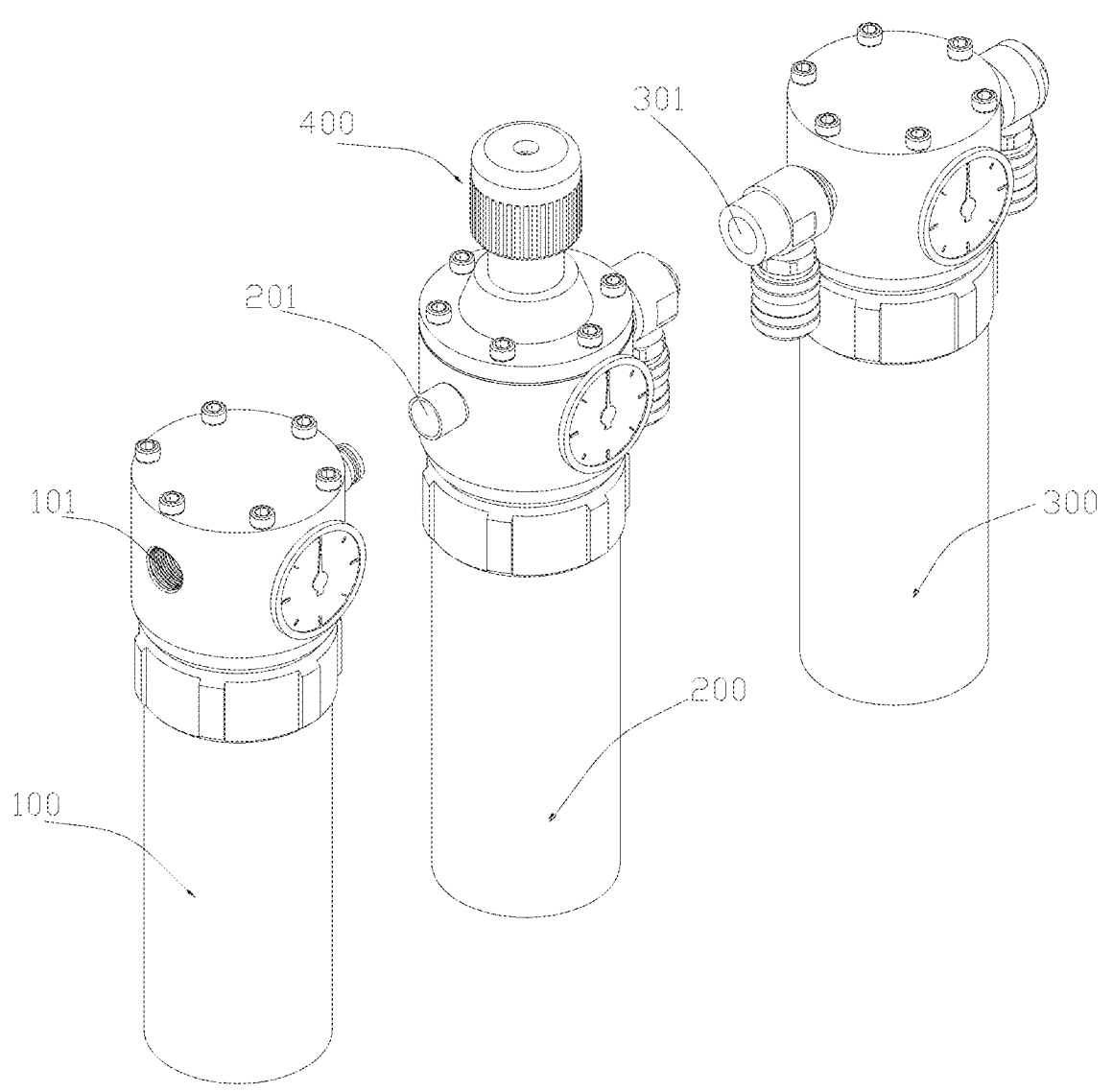
FIG. 15 is a third schematic exploded structural diagram of the filter device according to an embodiment of the present application.
Figure 16:
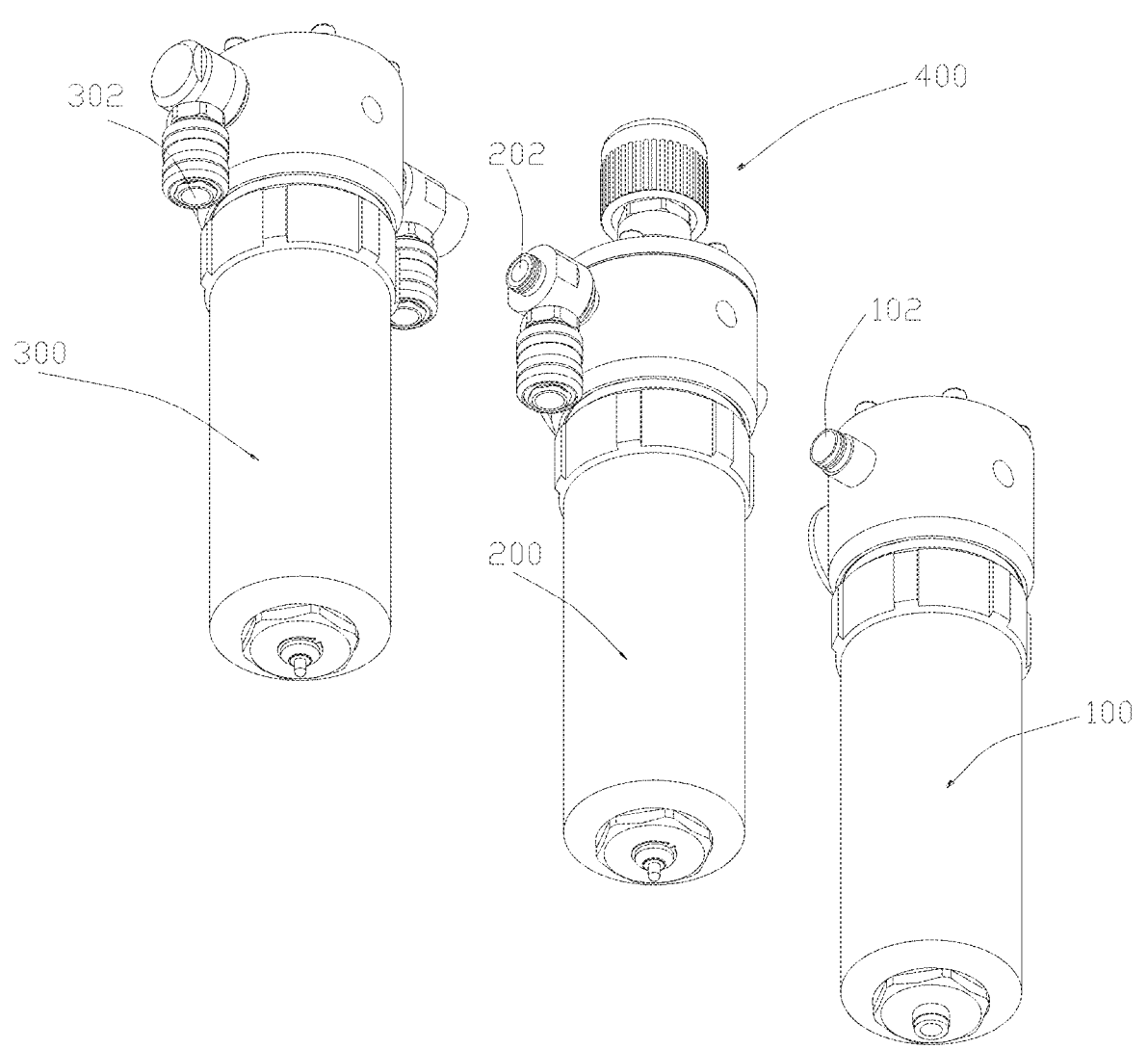
FIG. 16 is a fourth schematic exploded structural diagram of the filter device according to an embodiment of the present application.

Referring to FIGS. 1 to 16, a filter device for compressed air includes first filter assembly 100, a second filter assembly 200, a third filter assembly 300 and an air pressure regulating assembly 400.

The first filter assembly 100 includes a first air inlet 101 and a first air outlet 102 The first air inlet 101 is configured to receive compressed air to be filtered.

The second filter assembly 200 having a second air inlet 201 and a second air outlet 202. The second air inlet 201 is in fluid communication with the first air outlet 102.

The third filter assembly 300 having a third air inlet 301 and a third air outlet 302. The third air inlet 301 is in fluid communication with the second air outlet 202, and the third air outlet 302 is configured to discharge filtered compressed air for use.

The air pressure regulating assembly 400 is connected to an upper end of the second filter assembly 200. The air pressure regulating assembly 400 includes an air inlet passage 401 in fluid communication with the second air inlet 201. The air pressure regulating assembly 400 is configured to regulate the pressure of air entering the second filter assembly 200.

With the above structural arrangement, the first filter assembly 100, the second filter assembly 200, and the third filter assembly 300 are sequentially connected such that the airflow passes in order through: the first air inlet 101→the first filter assembly 100→the first air outlet 102→the second air inlet 201→the second filter assembly 200→the second air outlet 202→the third air inlet 301→the third filter assembly 300→the third air outlet 302. The air undergoes multi-stage filtration, thereby effectively removing impurities such as water, oil, and dust, and ensuring the filtering performance of the filter device for compressed air.

Further, the air inlet passage 401 is in fluid communication with the second air inlet 201, so that the air pressure at the second air inlet 201 remains consistent with the pressure regulated by the air pressure regulating assembly 400, thereby maintaining the pressure of the airflow entering the second filter assembly 200 within an operating pressure range. This arrangement not only ensures the overall filtering effect of the filter but also prevents damage to filter media such as coalescing filtering components, thereby extending the service life of the filter device.

In the present embodiment, the air pressure regulating assembly 400 includes a base 410, a first elastic component 420, a valve needle 430, an active valve 440, a second elastic component 450, a moving part 460, and an adjustment knob 470.

The base 410 is connected to the upper end of the second filter assembly 200. The air inlet passage 401 is provided in the base 410. The base 410 is provided with a valve chamber 403. Two ends of the first elastic component 420 respectively abut against a bottom portion of the valve needle 430 and a bottom wall of the valve chamber 403. The valve needle 430 is movably arranged to abut against the active valve 440 so as to open or close a vent hole 441 in the active valve 440. A lower end of the second elastic component 450 abuts against an upper portion of the active valve 440, and an upper end of the second elastic component 450 abuts against the moving part 460. The adjustment knob 470 is rotatably connected to the base 410 and configured to drive the moving part 460 upward and downward. Further, a side wall of the base 410 is provided with an exhaust hole 402 in fluid communication with the valve chamber 403.

With the above structural arrangement, the upper end of the second elastic component 450 abuts against the moving part 460, and the lower end of the second elastic component 450 abuts against the active valve 440, such that the elastic force of the second elastic component 450 resists upward sliding of the active valve 440.

When airflow enters the valve chamber 403 along the air inlet passage 401, the pressure inside the valve chamber 403 increases, and the pressure of the airflow causes the active valve 440 to have a tendency to slide upward. When the pressure of the airflow exceeds the elastic force of the second elastic component 450, the active valve 440 slides upward until the valve needle 430 separates from the active valve 440, at which point the vent hole 441 in the active valve 440 opens, allowing the airflow to pass through the vent hole 441 and ultimately be discharged through the exhaust hole 402.

This process continues until the elastic force exerted by the second elastic component 450 on the active valve 440 balances the pressure exerted by the airflow on the active valve 440, at which time the air pressure becomes the maximum pressure allowed to enter the second filter assembly 200.

A user can rotate the adjustment knob 470 to drive the moving part 460 to move upward or downward, thereby adjusting a compression degree of the second elastic component 450 and changing the magnitude of the force exerted by the second elastic component 450 on the active valve 440, so as to regulate the maximum air pressure allowed to flow into the second filter assembly 200. In this manner, the user can perform adjustment in accordance with the rated operating pressure of the filter media in the second filter assembly 200, thereby ensuring the filtering effect while extending the service life of the filter media in the second filter assembly 200.

Meanwhile, the elastic potential energy of the first elastic component 420 urges the valve needle 430 to move upward. Before the airflow pressure reaches the maximum value, the valve needle 430 remains abutted against the active valve 440, thereby maintaining closure of the vent hole 441 in the active valve 440 and preventing pressure leakage due to unintended air outflow.

In this embodiment, the active valve 440 is provided with a first sealing component 442. The vent hole 441 extends through the active valve 440 and the first sealing component 442. The upper end of the valve needle 430 abuts against the first sealing component 442 and covers the vent hole 441. The outer surface of the active valve 440 is provided with a first sealing ring 443, and the first sealing ring 443 is in sealing contact with an inner wall of the valve chamber 403.

By means of the above structural arrangement, the first sealing ring 443 prevents airflow from escaping through the gap between the inner wall of the valve chamber 403 and the outer surface of the active valve 440. Furthermore, the first sealing component 442 possesses elasticity, thereby enabling the upper end of the valve needle 430 to more tightly conform to the first sealing component 442, thus effectively covering and sealing the vent hole 441. This configuration ensures the overall sealing performance of the filter device and guarantees that the pressure of the airflow is fully applied to the active valve 440.

In this embodiment, the adjustment knob 470 is provided with a threaded rod portion 471 extending through a top wall of the valve chamber 403 into an interior of the valve chamber 403. The moving part 460 is threadedly engaged with the threaded rod portion 471 and configured to slide upward and downward within the valve chamber 403.

Through the above structural configuration, during use, a user may rotate the adjustment knob 470, causing the moving part 460 to rotate relative to the threaded rod portion 471. As a result, the moving part 460 translates along an axial extension direction of the threaded rod portion 471, thereby driving the second elastic component 450 to move upward and downward. Consequently, the magnitude of the pressure exerted by the second elastic component 450 on the active valve 440 can be adjusted.

In this embodiment, the second filter assembly 200 includes an elastic driving piece 250, a push rod 260, a push rod seat 270, and a third elastic component 280. The elastic driving piece 250 is positioned between the base 410 and the second filter assembly 200, such that a pressure chamber 204 is formed between the elastic driving piece 250 and the base 410. The base 410 is provided with an air guiding passage 404 that communicates the valve chamber 403 with the pressure chamber 204. An exhaust chamber 205 communicating with the second air outlet 202 is formed between the elastic driving piece 250 and an upper surface of the second filter assembly 200. The upper portion of the second filter assembly 200 is provided with a push rod chamber 206, and the push rod chamber 206 communicates with the exhaust chamber 205 via an air guide hole 207. The lower end of the third elastic component 280 abuts against the bottom wall of the push rod chamber 206, while the upper end of the third elastic component 280 abuts against the push rod seat 270, thereby imparting to the push rod seat 270 a tendency to cover and close the air guide hole 207. The upper end of the push rod 260 abuts against the lower surface of the elastic driving piece 250.

By virtue of the above structural arrangement, airflow within the valve chamber 403 flows into the pressure chamber 204 along the air guiding passage 404. The pressure of the airflow acts on the upper surface of the elastic driving piece 250, causing it to move downward. The elastic driving piece 250 then pushes downward against the push rod 260, driving both the push rod 260 and the push rod seat 270 to move downward, thereby disengaging the push rod seat 270 from the air guide hole 207. Airflow discharged from the interior of the second filter assembly 200 flows along the air guide hole 207 through the push rod chamber 206 and into the exhaust chamber 205, and ultimately exits through the second air outlet 202.

Meanwhile, the elastic force of the third elastic component 280 provides the push rod seat 270 with a tendency to cover the air guide hole 207, and correspondingly imparts an upward movement tendency to the push rod 260. This elastic force also resists downward deflection of the elastic driving piece 250. In addition, the pressure of the airflow entering the exhaust chamber 205 exerts an upward deflection tendency on the elastic driving piece 250. Stable outflow of the airflow from the second filter assembly 200 through the exhaust chamber 205 and the second air outlet 202 is achieved only when a balance is reached among: (i) the pressure applied by the airflow in the pressure chamber 204 to the elastic driving piece 250, (ii) the elastic force of the third elastic component 280, and (iii) the pressure applied by the airflow in the exhaust chamber 205 to the elastic driving piece 250.

Accordingly, by rotating the adjustment knob 470, a user can simultaneously regulate both the pressure and flow velocity of the airflow entering the second filter assembly 200 as well as the pressure and flow velocity of the airflow discharged from the second filter assembly 200, achieving multiple beneficial effects with a single adjustment. This results in enhanced overall stability of the filter device and improved filtration performance.

In this embodiment, the second filter assembly 200 is provided with a limiting groove 208. The push rod seat 270 includes an insertion portion 271 and an abutting portion 272. A second sealing ring 273 is disposed around an outer periphery of the insertion portion 271. The insertion portion 271 is movably inserted into the limiting groove 208. The upper surface of the abutting portion 272 is provided with a third sealing ring 274. When the push rod seat 270 covers and closes the air guide hole 207, the third sealing ring 274 surrounds the air guide hole 207.

Through the above structural arrangement, during upward and downward movement of the push rod seat 270, the insertion portion 271 remains within the limiting groove 208 and slides axially therein. The limiting groove 208 restricts the push rod seat 270 to move only in the axial direction, thereby ensuring stable and reliable operation of the filter device. Additionally, when the push rod seat 270 is in the closed position covering the air guide hole 207, the third sealing ring 274 closely surrounds the air guide hole 207, effectively preventing airflow from leaking through any gap between the abutting portion 272 and the edge of the air guide hole 207.

In this embodiment, the first filter assembly 100 includes a first mounting seat 110, a first filtering component 120, a first housing 130, and an automatic drain device 500. The first housing 130 is connected to the first mounting seat 110, and the two together enclose a first filtering space 103. The first filtering component 120 is connected to the first mounting seat 110 and is accommodated within the first filtering space 103. The automatic drain device 500 is disposed within the first filtering space 103 and is configured to open the drain passage 131 when the liquid level of accumulated liquid is higher than a preset level, thereby permitting discharge of the accumulated liquid.

By means of the above structural configuration, the first filtering component 120 is positioned within the first filtering space 103, which enables efficient filtration of the airflow while simultaneously providing protection for the first filtering component 120 against damage. After the airflow passes through the first filtering component 120, liquid droplets such as water and oil therein are separated under the effects of centrifugal force, gravity, and the like, ultimately forming accumulated liquid that settles at the bottom of the first filtering space 103. When the liquid level of the accumulated liquid exceeds the predetermined threshold, the automatic drain device 500 opens the drain passage 131, allowing the accumulated liquid in the first filtering space 103 to be discharged automatically without the need to open or disassemble the first filter assembly 100, thereby achieving convenient and automatic drainage.

In the present embodiment, the automatic drainage device 500 includes a limiting housing 510, a floating part 520, a second sealing component 530, a drainage seat 540, and a fourth elastic component 550. The lower portion of the drainage seat 540 is provided with a drainage hole 501 in fluid communication with the drain passage 131. The second sealing component 530 is disposed in the drainage seat 540. A lower end of the fourth elastic component 550 abuts against the upper surface of the second sealing component 530, while an upper end of the fourth elastic component 550 abuts against an inner wall of the drainage seat 540, thereby biasing the second sealing component 530 toward sealing the drainage hole 501. The floating part 520 is connected to the second sealing component 530 via a connecting rod 560. Under an action of a buoyant force exerted by the accumulated liquid, the floating part 520 is configured to drive the second sealing component 530 to disengage from the drainage hole 501. The limiting housing 510 is disposed so as to cover the floating part 520.

With the above structural arrangement, when the liquid level of the accumulated liquid exceeds a preset level, the buoyant force of the accumulated liquid drives the floating part 520 to move upward, which in turn pulls the second sealing component 530 via the connecting rod 560, causing the second sealing component 530 to separate from the drainage hole 501 at the lower portion of the drainage seat 540. Consequently, the accumulated liquid flows out along the drainage hole 501 and the drain passage 131 under a combined action of gravity and the air pressure inside the first filtering space 103, thereby achieving automatic drainage. This ensures cleanliness and dryness within the first filtering space 103, prevents the accumulated liquid from submerging the first filtering component 120, and avoids adverse effects on the filtering performance.

In the present embodiment, the drainage seat 540 is provided with a limiting boss 541, and the floating part 520 is provided with a limiting passage 521. The limiting boss 541 is inserted into the limiting passage 521, and the connecting rod 560 extends through the limiting boss 541.

With the above structural arrangement, the floating part 520 is sleeved over the limiting boss 541, thereby restricting its radial movement and ensuring purely vertical sliding. Furthermore, the connecting rod 560 passing through the limiting boss 541 further constrains the sliding direction of the floating part 520, resulting in a more stable overall structure of the filter device.

In the present embodiment, the second filter assembly 200 includes a second mounting base 210, a second filtering component 220, and a second housing 230. The second housing 230 is connected to the second mounting base 210, and together they enclose a second filtering space 203. The second filtering component 220 is connected to the second mounting base 210 and is accommodated within the second filtering space 203.

With the above structural arrangement, the second filtering component 220 is positioned within the second filtering space 203, which enables efficient filtration of the airflow while simultaneously providing protection to the second filtering component 220 and preventing damage thereto.

In the present embodiment, the third filter assembly 300 includes a third mounting base 310, a third filtering component 320, and a third housing 330. The third housing 330 is connected to the third mounting base 310, and together they enclose a third filtering space 303. The third filtering component 320 is connected to the third mounting base 310 and is accommodated within the third filtering space 303.

With the above structural arrangement, the third filtering component 320 is positioned within the third filtering space 303, which enables efficient filtration of the airflow while simultaneously providing protection to the third filtering component 320 and preventing damage thereto.

In the present embodiment, the first filter assembly 100 further includes a first protective cover 140 and a first connecting rod 150. An upper end of the first connecting rod 150 is threadedly connected to the first mounting base 110, and a lower end of the first connecting rod 150 is threadedly connected to both a bottom of the first protective cover 140 and a bottom of the first filtering component 120. An upper portion of the first filtering component 120 is abutted against the first mounting base 110. The bottom of the first protective cover 140 is further provided with a plurality of through holes 141.

With the above structural arrangement, the first connecting rod 150 securely fixes both the first protective cover 140 and the first filtering component 120 to the first mounting base 110, thereby facilitating convenient assembly and disassembly of the filter device. Moreover, the first protective cover 140 effectively protects the first filtering component 120 from damage during installation or transportation of the filter device. Furthermore, the accumulated liquid filtered by the first filtering component 120 can flow out through the through holes 141 at the bottom of the first protective cover 140 and accumulate at the bottom of the first filtering space 103.

In the present embodiment, the first filtering component 120 is a frustoconical porous brass filter having a wider upper portion and a narrower lower portion. The frustoconical configuration ensures that the pressure exerted by the air on the inner wall of the porous brass filter is substantially uniform from top to bottom, allowing each portion of the porous brass filter to fully participate in air filtration and thereby improving filtration efficiency. The pore diameter of the porous brass filter is generally in the range of 5 μm to 50 μm (preferably 8 μm or 40 μm). By virtue of centrifugal force combined with frictional interaction, compressed air is caused to collide with and rub against the inner wall of the filter and pass through the porous brass filter, effectively removing large particles, water, and oil from the air, such that the impurities collect at the bottom of the first filtering space 103.

In the present embodiment, the second filter assembly 200 further includes a first end cap 241, a second connecting rod 242, and a second end cap 243. The first end cap 241 and the second end cap 243 are respectively fitted over the two ends of the second filtering component 220. An upper end of the second connecting rod 242 is threadedly connected to the second mounting base 210, and a lower end of the second connecting rod 242 passes through the first end cap 241 and the second filtering component 220. The second connecting rod 242 is fixedly connected to the second end cap 243.

With the above structural arrangement, the first end cap 241 and the second end cap 243 are respectively connected to the two ends of the second filtering component 220, thereby effectively protecting the edges of the second filtering component 220 and preventing damage thereto. The second connecting rod 242 extends through the first end cap 241 and the second filtering component 220 and is connected to the second mounting base 210, providing convenient connection and facilitating users in replacing filter materials.

In the present embodiment, the second filtering component 220 is a cylindrical coalescing filter formed by multiple layers of filter media wound sequentially around a central core. Preferably, through coalescence, the filter causes liquid particles such as water and oil to aggregate into larger droplets while simultaneously removing particles and associated aerosols larger than 0.01 μm, such that the impurities collect at the bottom of the second filtering space 203.

In the present embodiment, the third filter assembly 300 further includes a third connecting rod 340. An upper end of the third connecting rod 340 passes upwardly through the third filtering component 320 and is threadedly connected to the third mounting base 310, while a lower end of the third connecting rod 340 abuts against the lower portion of the third filtering component 320.

With the above structural arrangement, during use, the third connecting rod 340 is inserted through the third filtering component 320, with its upper end threadedly connected to the third mounting base 310 and its lower end abutting against the lower portion of the third filtering component 320, thereby stably securing the third filtering component 320 in position while enabling convenient assembly and disassembly.

In the present embodiment, the third filtering component 320 is an activated carbon filter. When compressed air passes through the activated carbon filter, the adsorption effect of the activated carbon effectively removes oil vapor, odors, and other hydrocarbons, such that the impurities collect at the bottom of the third filtering space 303.

In this embodiment, the second mounting base 210 is provided with an annular airflow chamber 211, an airflow inlet channel 212, and an airflow outlet channel 213. The annular airflow chamber 211 is in fluid communication with the second air inlet 201. The airflow inlet channel 212 is in fluid communication with both the annular airflow chamber 211 and the central cavity 221 of the second filtering component 220. The airflow outlet channel 213 is in fluid communication with both the second filtering space 203 and the ejector rod chamber 206.

With the above structural arrangement, after entering through the second air inlet 201, the airflow flows into the annular airflow chamber 211, then enters the central cavity 221 of the second filtering component 220 through a plurality of uniformly distributed airflow inlet channels 212, passes through the sidewall of the second filtering component 220 into the second filtering space 203, subsequently flows into the ejector rod chamber 206 along the airflow outlet channels 213, and is finally discharged through the second air outlet 202.

In this embodiment, the second filter assembly 200 is further provided with a semi-automatic drain assembly 600, which is configured to allow accumulated liquid to flow out upon manual pressing by a user. The semi-automatic drain assembly 600 includes a movable plug 610 and a fourth sealing ring 620. A bottom of the second housing 230 is provided with a drain channel 231 and a counterbore 232 in fluid communication with the drain channel 231. The fourth sealing ring 620 is disposed within the counterbore 232. The movable plug 610 includes a main body portion 611 and a head portion 612, the main body portion 611 is movably inserted into the drain channel 231, and the head portion 612 is movably inserted into the counterbore 232 and is config-ured for selectively abutting against or separating from the fourth sealing ring 620.

With the above structural arrangement, when it is neces-sary to discharge liquid using the semi-automatic drain assembly 600, the user may push the movable plug 610 upward using a finger or a tool, causing the movable plug 610 to move upward until the head portion 612 separates from the fourth sealing ring 620. At this time, the accumu-lated liquid in the second filtering space 203 can flow out through the gap between the inner wall of the drain channel 231 and the main body portion 611. When the user releases the movable plug 610, the head portion 612 of the movable plug 610 is pressed tightly against the fourth sealing ring 620 under the action of pressure or restoring force, thereby ensuring the sealing performance of the filter device and preventing air leakage. Preferably, a similar semi-automatic drain assembly 600 is also provided on the third filter assembly 300.

In this embodiment, the semi-automatic drain assembly 600 further includes a fifth elastic component 630. The inner wall of the drain channel 231 is provided with a mounting platform 233. A lower end of the fifth elastic component 630 abuts against the mounting platform 233, while the upper end of the fifth elastic component 630 abuts against the head portion 612. A portion of the main body portion 611 that extends out of the drain channel 231 is further provided with a limiting portion 613, which is configured to restrict the distance by which the main body portion 611 can enter the drain channel 231.

With the above structural arrangement, when the second filtering space 203 contains compressed air, the air pressure drives the movable plug 610 downward until the head portion 612 of the movable plug 610 is tightly pressed against the fourth sealing ring 620, at which point the fifth elastic component 630 is compressed and deformed. When the filter device is in an idle state and the internal air pressure in the second filtering space 203 is low, the fifth elastic component 630 returns to its original state (extends), caus-ing the movable plug 610 to move upward slightly, such that a gap is formed between the head portion 612 and the fourth sealing ring 620. Consequently, the accumulated liquid in the second filtering space 203 can flow out through the gap between the inner wall of the drain channel 231 and the main body portion 611, thereby achieving semi-automatic dis-charge of the accumulated liquid.

The above are only some embodiments of the present disclosure, and neither the words nor the drawings can limit the protection scope of the present disclosure. Any equiva-lent structural transformation made by using the contents of the specification and the drawings of the present disclosure under the overall concept of the present disclosure, or directly/indirectly applied in other related technical fields are included in the protection scope of the present disclo-sure.

12

What is claimed is:

1. A filter device for compressed air, comprising:
   a first filter assembly having a first air inlet and a first air outlet, wherein the first air inlet is configured to receive compressed air to be filtered;
   a second filter assembly having a second air inlet and a second air outlet, wherein the second air inlet is in fluid communication with the first air outlet;
   a third filter assembly having a third air inlet and a third air outlet, wherein the third air inlet is in fluid com-munication with the second air outlet, and the third air outlet is configured to discharge filtered compressed air for use;
   an air pressure regulating assembly connected to an upper end of the second filter assembly, the air pressure regulating assembly having an air inlet passage in fluid communication with the second air inlet, wherein the air pressure regulating assembly is configured to regu-late pressure of air entering the second filter assembly.

2. The filter device according to claim 1, wherein the air pressure regulating assembly comprises a base, a first elastic component, a valve needle, an active valve, a second elastic component, a moving part, and an adjustment knob;
   the base is connected to the upper end of the second filter assembly, and the base is provided with the air inlet passage and a valve chamber;
   the first elastic member comprises two ends respectively abutting against a bottom of the valve needle and a bottom wall of the valve chamber;
   the valve needle is movably abutted against the active valve to open or close a vent hole in the active valve;
   a lower end of the second elastic component is abutted against an upper portion of the active valve, and an upper end of the second elastic component is abutted against the moving part;
   the adjustment knob is rotatably connected to the base and configured to drive the moving part upward and down-ward;
   a side wall of the base is further provided with an exhaust hole in fluid communication with the valve chamber.

3. The filter device according to claim 2, wherein the active valve is provided with a first sealing component, wherein the vent hole extends through the active valve and the first sealing component;
   an upper end of the valve needle abuts against the first sealing component and covers the vent hole;
   an outer surface of the active valve comprises a first sealing ring sealingly engaged with an inner wall of the valve chamber.

4. The filter device according to claim 2, wherein the adjustment knob comprises a threaded rod portion extending through a top wall of the valve chamber into the valve chamber;
   wherein the moving part is threadedly engaged with the threaded rod portion and configured to slide upward and downward within the valve chamber.

5. The filter device according to claim 2, wherein the second filter assembly comprises an elastic driving piece, a push rod, a push rod seat, and a third elastic component;
   wherein the elastic driving piece is positioned between the base and the second filter assembly, wherein a pressure chamber is formed between the elastic driving piece and the base;
   the base comprises an air guiding passage communicating the valve chamber with the pressure chamber;

an exhaust chamber communicating with the second air outlet is formed between the elastic driving piece and an upper surface of the second filter assembly;

an upper portion of the second filter assembly is provided with a push rod chamber; the push rod chamber is in communication with the exhaust chamber through an air guide hole;

a lower end of the third elastic component is abutted against a lower wall of the push rod chamber, an upper end of the third elastic component is abutted against the push rod seat, thereby biasing the push rod seat toward covering the air guide hole;

and an upper end of the push rod is abutted against a lower surface of the elastic driving piece.

6. The filter device according to claim 5, wherein the second filter assembly is provided with a limiting groove;

wherein the push rod seat comprises an insertion portion and an abutting portion, and a second sealing ring is disposed around an outer periphery of the insertion portion;

the insertion portion is movably inserted into the limiting groove;

an upper surface of the abutting portion is provided with a third sealing ring that surrounds and seals the air guide hole when the push rod seat is in a position covering the air guide hole.

7. The filter device according to claim 1, wherein the first filter assembly comprises a first mounting seat, a first filtering component, a first housing, and an automatic drain device;

wherein the first housing is connected to the first mounting seat, the first housing and the first mounting seat together enclose a first filtering space;

the first filtering component is connected to the first mounting seat and is accommodated within the first filtering space;

wherein the automatic drain device is disposed in the first filtering space, and the automatic drain device is configured to open a drain passage when a liquid level of accumulated liquid is higher than a preset level, thereby discharging the accumulated liquid.

8. The filter device according to claim 7, wherein the automatic drain device comprises a limiting housing, a floating part, a second sealing component, a drain seat, and a fourth elastic component;

wherein a lower portion of the drain seat is provided with a drainage hole communicating with the drain passage;

the second sealing component is disposed in the drain seat;

wherein a lower end of the fourth elastic component is abutted against an upper surface of the second sealing component, an upper end of the fourth elastic component is abutted against an inner wall of the drain seat, thereby biasing the second sealing component toward sealing the drainage hole;

the floating part is connected to the second sealing component through a connecting rod; and the floating part is configured to, under an action of a buoyancy force exerted by the accumulated liquid, drive the second sealing component away from the drainage hole;

and the limiting housing is disposed to cover the floating part.

9. The filter device according to claim 8, wherein the drain seat is provided with a limiting boss, the floating part is provided with a limiting channel, the limiting boss is inserted into the limiting channel, and the connecting rod extends through the limiting boss.

10. The filter device according to claim 5, wherein the second filter assembly comprises a second mounting seat, a second filtering component, and a second housing;

wherein the second housing is connected to the second mounting seat, and the second housing and the second mounting seat together enclose a second filtering space; and the second filtering component is connected to the second mounting seat and is accommodated within the second filtering space.

11. The filter device according to claim 1, wherein the third filter assembly comprises a third mounting seat, a third filtering component, and a third housing;

wherein the third housing is connected to the third mounting seat, the third housing and the third mounting seat together enclosing a third filtering space; and the third filtering component is connected to the third mounting seat and accommodated within the third filtering space.

12. The filter device according to claim 7, wherein the first filter assembly further comprises a first protective cover and a first connecting rod;

wherein an upper end of the first connecting rod is threadedly connected to the first mounting seat, a lower end of the first connecting rod is threadedly connected to a bottom of the first protective cover and a bottom of the first filtering component;

an upper portion of the first filtering component is abutted against the first mounting seat;

the bottom of the first protective cover is further provided with a plurality of through holes.

13. The filter device according to claim 7, wherein the first filtering component is a frustoconical porous brass filter having a wider upper portion and a narrower lower portion.

14. The filter device according to claim 10, wherein the second filter assembly further comprises a first end cap, a second connecting rod, and a second end cap;

wherein the first end cap and the second end cap are respectively sleeved over two ends of the second filtering component;

an upper end of the second connecting rod is threadedly connected to the second mounting seat, and a lower end of the second connecting rod passes through the first end cap and the second filtering component, and the second connecting rod is fixedly connected to the second end cap.

15. The filter device according to claim 14, wherein the second filtering component is a cylindrical coalescing filter formed by multiple layers of filter media sequentially wound and enclosed around each other.

16. The filter device according to claim 11, wherein the third filter assembly further comprises a third connecting rod;

wherein an upper end of the third connecting rod passes upwardly through the third filtering component and is threadedly connected to the third mounting seat; and a lower end of the third connecting rod abuts against a lower portion of the third filtering component.

17. The filter device according to claim 16, wherein the third filtering component is an activated carbon filter.

18. The filter device according to claim 14, wherein the second mounting seat is provided with an annular airflow chamber, an airflow inlet channel, and an airflow outlet channel;

wherein the annular airflow chamber in communication with the second air inlet, the airflow inlet channel in communication with the annular airflow chamber and a central cavity of the second filtering component, and the airflow outlet channel in communication with the second filtering space and the push rod chamber.

19. The filter device according to claim 10, wherein the second filter assembly is further provided with a semi-automatic drain assembly configured to allow accumulated liquid to flow out upon manual pressing by a user;

wherein the semi-automatic drain assembly comprises a movable plug and a fourth sealing ring, a bottom of the second housing is provided with a drain channel and a counterbore communicating with the drain channel;

the fourth sealing ring is disposed in the counterbore;

the movable plug comprises a main body portion and a head portion, the main body portion is movably inserted in the drain channel, and the head portion is movably inserted in the counterbore and is configured for selectively abutting against or separating from the fourth sealing ring.

20. The filter device according to claim 19, wherein the semi-automatic drain assembly further comprises a fifth elastic component;

wherein an inner wall of the drain channel is provided with a mounting platform;

a lower end of the fifth elastic component is abutted against the mounting platform; an upper end of the fifth elastic component is abutted against the head portion; and a portion of an outer surface of the main body portion that protrudes out of the drain channel is further provided with a limiting portion, the limiting portion is configured to limit a distance by which the main body portion enters the drain channel.

\* \* \* \* \*